United States Patent
Hazell et al.

Patent Number: 6,070,901
Date of Patent: Jun. 6, 2000

[54] AUTOMOTIVE INSTRUMENT PANEL HAVING AN INTEGRAL AIRBAG

[75] Inventors: Scott William Hazell; Marshall Lawrence Quade, both of Pinckney; Lisandro Trevino, Ann Arbor; Edgar Valdez, Beverely Hills; Ashir Prafull Thakore, Novi, all of Mich.

[73] Assignee: Ford Global Technologies, Inc., Dearborn, Mich.

[21] Appl. No.: 09/176,266

[22] Filed: Oct. 19, 1998

[51] Int. Cl.⁷ .................................................. B60R 21/20
[52] U.S. Cl. .......................................... 280/728.3; 280/732
[58] Field of Search ................................ 280/728.3, 732; 83/171; 219/121.67, 121.83, 121.62

[56] References Cited

U.S. PATENT DOCUMENTS

| | | | |
|---|---|---|---|
| 5,026,964 | 6/1991 | Somers et al. | 219/121.7 |
| 5,080,393 | 1/1992 | Dixon, Jr. et al. . | |
| 5,082,310 | 1/1992 | Bauer . | |
| 5,217,244 | 6/1993 | Bauer . | |
| 5,342,088 | 8/1994 | Bauer . | |
| 5,386,430 | 1/1995 | Yamagishi et al. | 372/57 |
| 5,393,088 | 2/1995 | Bauer et al. . | |
| 5,447,328 | 9/1995 | Iannazzi et al. . | |
| 5,478,106 | 12/1995 | Bauer et al. . | |
| 5,496,059 | 3/1996 | Bauer . | |
| 5,522,616 | 6/1996 | Bauer et al. . | |
| 5,611,564 | 3/1997 | Bauer . | |
| 5,738,367 | 4/1998 | Zichichi et al. . | |
| 5,744,776 | 4/1998 | Bauer . | |
| 5,775,727 | 7/1998 | Sun et al. | 280/728.3 |
| 5,810,388 | 9/1998 | Berardi et al. | 280/728.3 |
| 5,863,062 | 1/1999 | Harada et al. | 280/728.3 |
| 5,883,356 | 3/1999 | Bauer et al. | 219/121.62 |
| 5,961,142 | 10/1999 | Shirake et al. | 280/728.3 |
| 5,961,143 | 10/1999 | Hlywka et al. | 280/728.3 |

*Primary Examiner*—Brian L. Johnson
*Assistant Examiner*—Tony Winner
*Attorney, Agent, or Firm*—Damian Porcari

[57] ABSTRACT

An automotive instrument panel having a concealed airbag. A molded substrate having first and second surfaces and an aperture therethrough receives an airbag. A curved metal door is secured to the first surface of the substrate by a plurality of fasteners extending through the substrate. The metal door has a generally U-shaped slot with first and second ends being spaced apart a distance greater than the length of the aperture. The slot is positioned radially outwardly of the aperture. The door also has a plurality of indentations to maintain a curved shape conforming with the surface of the substrate. A molded covering overlies the first surface of the door and is secured thereto with an intermediate layer of foam. A foam gasket overlies the slot between the door and the substrate. A foam impermeable layer is placed between the gasket and door to prevent injected foam from impregnating the foam gasket and interfering with the opening of the door. An airbag chute is secured to the second surface of the substrate by the attaching fasteners. The airbag causes the metal door to fold along the line between the first and second ends of the slots.

8 Claims, 4 Drawing Sheets

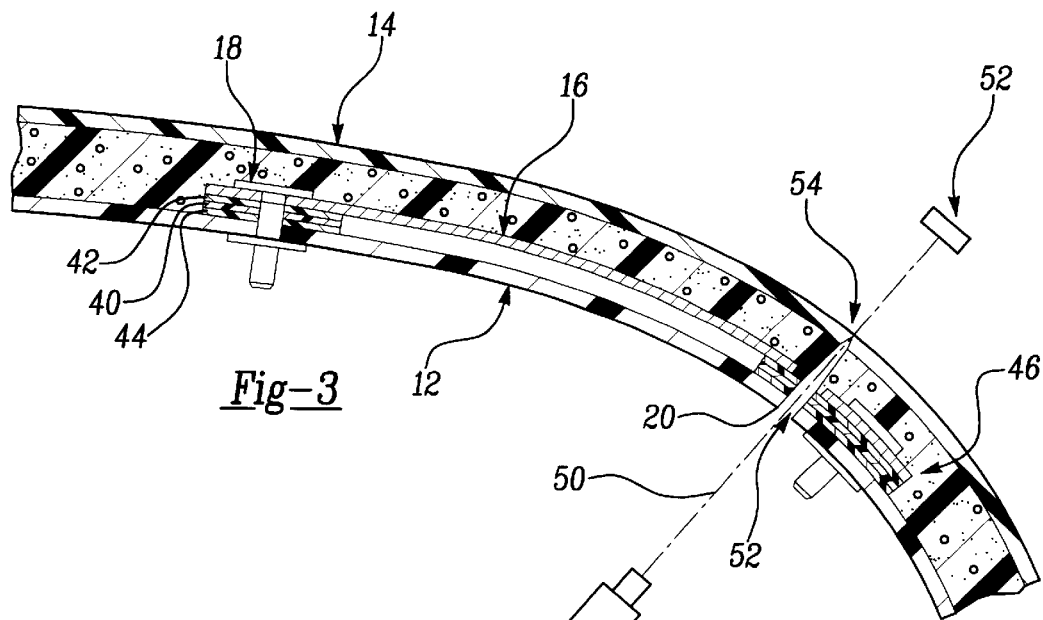
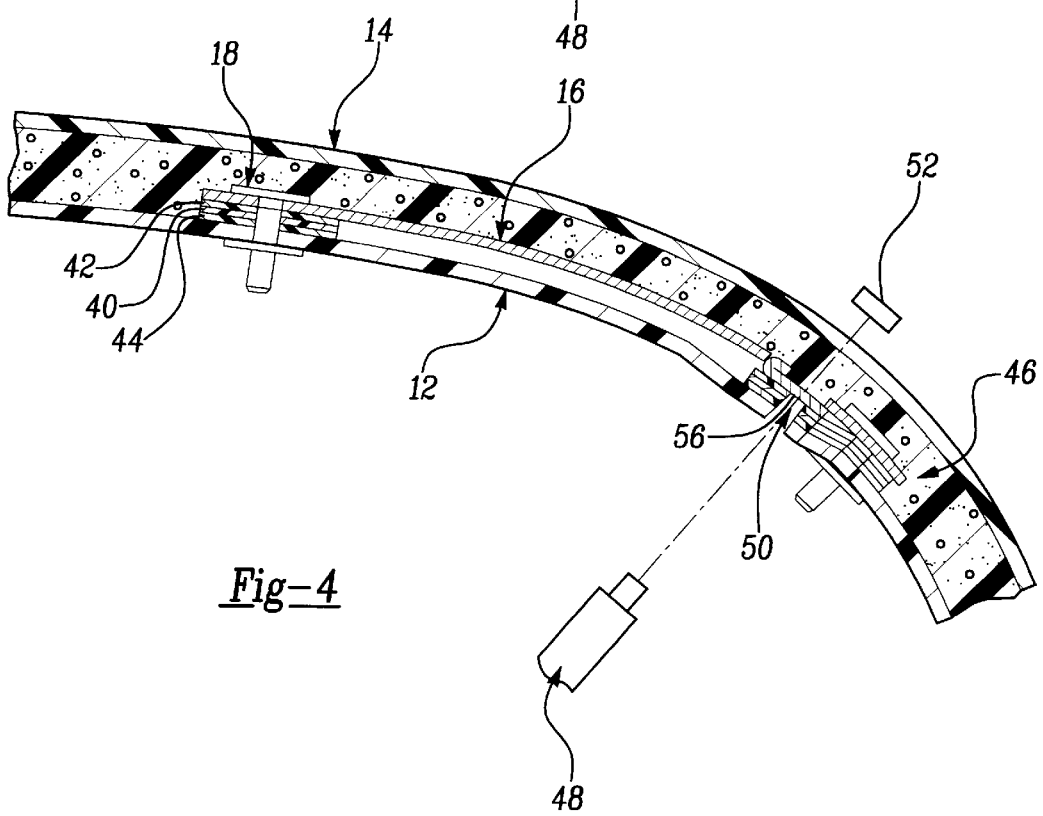

AUTOMOTIVE INSTRUMENT PANEL HAVING AN INTEGRAL AIRBAG

BACKGROUND OF THE INVENTION

1. Field of the Invention

The present invention relates to a method of manufacturing an automotive instrument panel having a concealed airbag. More particularly, the present invention relates to a method of forming an airbag-receiving opening in a plastic substrate by imaging a light beam through the substrate and forming a fracturable opening path in the instrument panel.

2. Description of the Related Art

It is known to manufacture an automotive airbag having a seamless covering. One such device is described in U.S. Pat. No. 5,447,328, issued Sep. 5, 1995. The reference teaches a hinged metal door secured to a plastic substrate. The hinge is secured to both the plastic substrate and the metal door and folds when the airbag is inflated. A deep groove directly overlying the perimeter of the metal door forms a weakened section in the covering that tears when the door is opened. An airbag door and cover of this construction is difficult to manufacture because a metal hinge must be secured to only one edge of the plastic substrate. It is also difficult to form a deep groove in the covering that directly overlies the perimeter of the metal door. The groove construction taught in the U.S. Pat. No. 5,447,328 patent extends almost to the surface of the plastic substrate, making it difficult to inject foam in the vicinity of the groove. It is desirable to inject foam between the cover and the door to secure the two components without causing the foam to impede the opening of the door.

It is also known that the rapid force needed to deploy an airbag causes stress on the molded plastic substrate when the door is attached to only one edge. Various frames may be attached to the perimeter of the airbag opening to make the substrate more rigid. An example of this construction is illustrated in U.S. Pat. No. 5,393,088 issued Feb. 28, 1995. A metal frame is secured within the aperture of a plastic substrate. A door is attached to one side of the frame with a hinge. The metal frame keeps the substrate from deforming under the impact of an inflating airbag.

Finally, it is also known to use a laser to score an instrument panel to form a weakening pattern. The laser completely penetrates the substrate and foam and partially penetrates the covering to form the weakening pattern. A method of forming this weakening pattern is described in U.S. Pat. No. 5,744,776 and is incorporated herein by reference. The U.S. Pat. No. 5,744,776 reference teaches bonding the substrate to the covering inside the weakened section. This results in the substrate being positioned in front of the deploying airbag. The rigid plastic substrate must be restrained. It is desirable to form an instrument panel with an aperture in the substrate for the airbag. This eliminates the need to restrain or tether the cutout section of substrate.

It is an advantage of the present invention to provide a seamless airbag covering having a hinged door that is secured to a substrate. It is a further object of the present invention to provide an easily manufacturable method of forming an aperture in the substrate by means of a laser beam by forming a cut-out section that is not adhered to the covering. It is also an advantage of the present invention to provide a method of removing a cutout section of the substrate and forming an airbag-receiving aperture in an instrument panel. The process further includes forming a fracturable opening through the covering in one operation.

These and other problems of the related art are overcome by the present invention.

SUMMARY OF THE INVENTION

The present invention is directed to a method of manufacturing an automotive instrument panel having a concealed airbag using the following steps. A molded plastic substrate having first and second surfaces receives a metal door having a peripheral portion and a generally U-shaped slot with first and second ends defining a foldable flap. The line between said first and second ends defines a folding axis for the flap. The door is secured to the substrate first surface panel exterior surface. A covering is positioned over the door and substrate. A foam is injected between the substrate and covering to secure the covering to the substrate and said door. A high intensity light beam is imaged on the substrate second surface in the area overlying said slot. The light beam completely penetrates the substrate and foam and partially penetrates the covering. The light beam is directed through the slot in the metal door and creates a fracturable opening path in the substrate, foam and covering. The light beam is also imaged on the substrate second surface in the area overlying said folding axis and completely penetrates the substrate and contacts the metal door. The light beam severs a cutout section of the substrate. The cutout section of substrate is removed to form an aperture through the substrate for an airbag. An airbag is secured behind the aperture. The airbag has sufficient force to fracture the opening path and fold the door when activated.

The invention enables the manufacture of an instrument panel having no visible indication of an airbag opening. The fracturable opening path does not create visible holes or marks on the appearance surface of the covering. A light beam detector positioned opposite of the light beam senses the intensity of light passing through the covering and causes the light beam to move or reduce power prior to forming a visible mark on the covering.

The invention also includes an automotive instrument panel having a concealed airbag made by the forgoing method. The panel includes a molded substrate to having first and second surfaces and an aperture receiving an airbag therethrough. A metal door is secured to the substrate first surface. The door has a peripheral portion and a generally U-shaped slot with first and second ends spaced apart. The U-shaped slot overlies the three perimeter sides of the aperture and defines a foldable flap. A covering overlies the door and substrate. Foam injected between the door and covering secures the covering to the substrate and door.

The foam and covering include a fracturable opening path within the slot. The opening path is made from a series of apertures formed through the foam and into the covering by a light beam and enables the foam and covering to fracture along the path. An airbag secured to the substrate second surface positioned behind the aperture has sufficient force to fracture the opening path and fold said door when activated.

The invention may be easily manufactured because the covering, door, foam and substrate are all assembled prior to forming an aperture in the substrate. The U-shaped slot enables the light beam to penetrate the foam and covering through from the second surface of the substrate. Because the aperture is directly aligned over the U-shaped slot, the airbag and fracturable opening are always properly positioned when assembled.

These and other desired objects of the present invention will become more apparent in the course of the following detailed description and appended claims. The invention may best be understood with reference to the accompanying drawings wherein illustrative embodiments are shown.

BRIEF DESCRIPTION OF THE DRAWINGS

FIG. 3 is a detailed cross-sectional view of an assemble instrument panel undergoing laser scoring.

FIG. 4 is a cross-sectional view of the instrument panel shown in FIG. 3 undergoing laser scoring in the vicinity of a tab.

DETAILED DESCRIPTION OF THE PREFERRED EMBODIMENT

Figure 1:
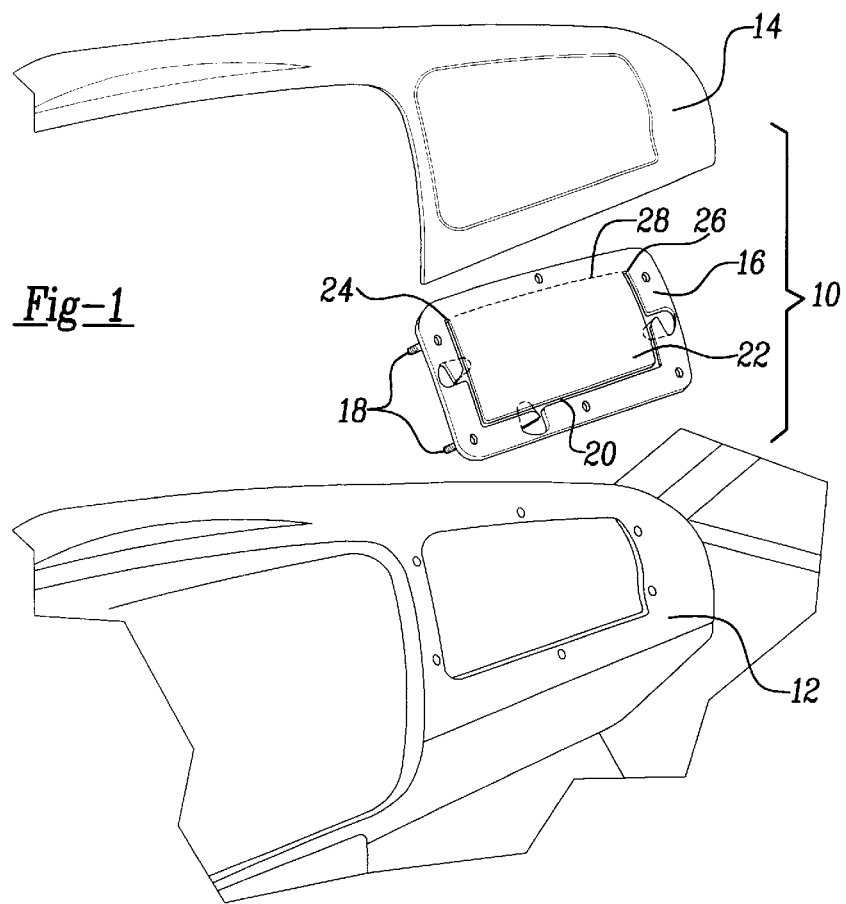
FIG. 1 is an exploded perspective view of an instrument panel prior to foaming.

The invention as illustrated in FIGS. 1–6 teaches a method of manufacturing an instrument panel having a concealed airbag. The present invention will be described through a series of drawings, which illustrate the laser scoring operations claimed. The invention will also be described as a method of manufacturing an automotive instrument panel, however other components may also be manufactured using the same or similar process, technique and equipment, and are included within the invention described herein.

The following items are a word list of the items described in the drawings and are reproduced to aid in understanding the invention;

10 instrument panel
12 substrate
14 covering
16 door
18 fasteners
20 U-shaped slot
22 flap
24 first end
26 second end
28 folding axis
30, 32, 34 tabs
36 J-shaped slot
38 folding axis
40 gasket
42, 44 foam impermeable layers
46 foam
48 laser
50 light beam
52 detector
54 fracturable opening path
56 areas
58 airbag chute
60 airbag
62 cross-car beam FIG. 1 is an exploded perspective view of an automotive instrument panel 10 having a plastic molded substrate 12 and a molded flexible covering 14. The substrate 12 is formed in the usual manner of injection molding from materials selected to be durable, lightweight and low-cost. Suitable materials for the substrate 12 include polyolefin. Especially preferred is polystyrene or styrene malaeic anhydride (SMA). The covering 14 is pre-molded in the final desired shape for attachment to the substrate 12. Suitable materials for the covering 14 include thermoplastic olefins. Especially preferred are thermoplastic urethanes, polyvinyl chlorides (PVC) or PVC-urethane blends. A variety of methods are known for molding the flexible covering including slush molding, thermoform molding, vacuum molding, spray molding and injection molding. A steel door 16 is attached to a curved surface of the substrate 12 with a plurality of fasteners 18 welded around the perimeter of the door 16. The fasteners 18 extend through the substrate 12 and secure the door 16 to the substrate.

A generally U-shaped slot 20 forms a foldable flap 22 in the door 16. The slot 20 has a first end 24 and a second end 26. The flap 22 generally folds along a folding axis 28 that is a line between the first end 24 and the second end 26. The door 16 is manufactured from relatively soft (low carbon) steel that bends when the force of the airbag is applied against the flap 22. The flap 22 is generally positioned to open upwardly towards the windshield when the instrument panel 10 is installed within a vehicle. The covering 14 has no visible markings or indentations on the surface displayed to the passenger to reveal the location of the airbag.

Figure 2:
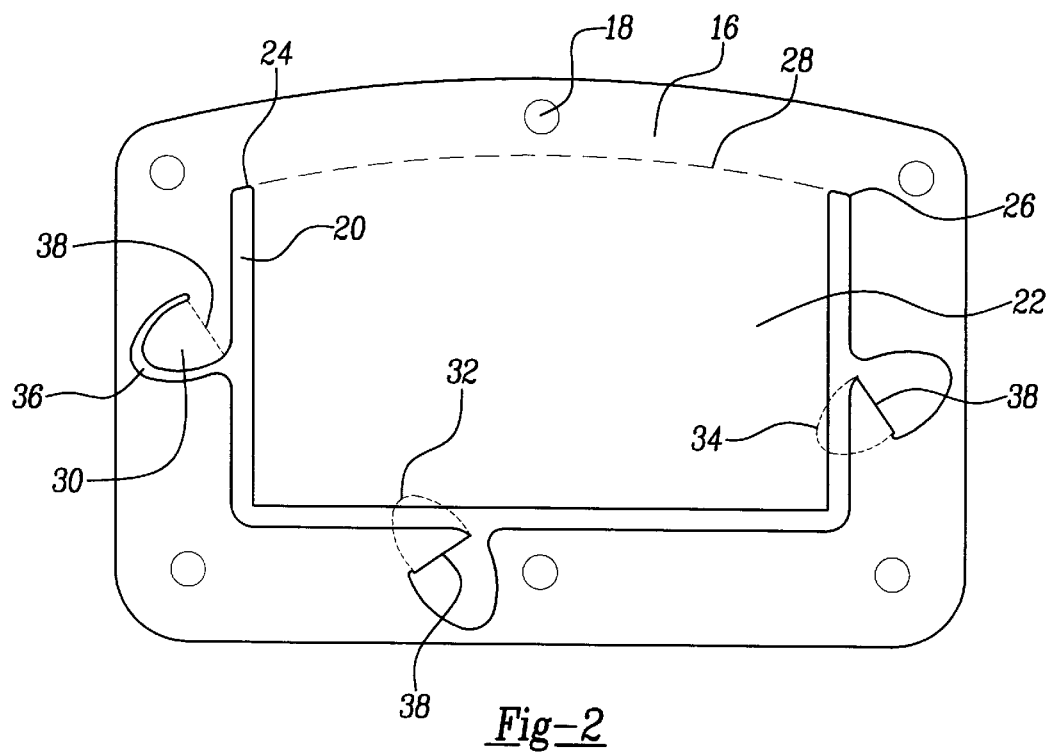
FIG. 2 is a plan view of a door useful in the present invention.

The door 16 is stamped from a sheet of steel to have the generally U-shaped slot 20 and a series of tabs 30, 32, 34 as shown in FIG. 2. The tab 30 is illustrated in its prebent state made by cutting or stamping a J-shaped slot 36 as shown. The tab 30 is folded under the slot 20 along the folding axis 38, as shown in tabs 32, 34. The tabs 30, 32, 34 serve to prevent an inward movement of the flap 22 toward the airbag. Alternatively, tabs 30, 32, 34 may be a steel section welded or fastened to the door 16. The door 16 may be curved to match the curved shape of the instrument panel 10.

The door 16 is secured to the substrate 12 as shown in FIG. 3. A urethane foam gasket 40 having foam impermeable layers 42, 44 is placed between the door 16 and the substrate 12. The thickness of the gasket 40 is shown greatly enlarged for clarity. The door 16 is secured to the substrate 12 with a series of fasteners 18. The fasteners 18 generally have a flat head and are welded to the door 16. Rivets or any other attachment means may be used for the fasteners 18.

The covering 14 is overlaid the substrate 12 and the door 16. The covering 14 is secured to the substrate 12 and the door 16 in a foaming operation. The covering 14 is juxtaposed the substrate 12 and is spaced a fixed distance apart. The distance between the covering 14 and the substrate 12 forms a space for receiving foam 46. Suitable foam materials include polymer foams. Especially useful are polyurethane foams. Polyurethane foams demonstrate good adhesion to each of the substrate, covering and door. The foam 46 secures the covering 14 to the substrate 12 and the door 16. To aid in securing the foam 46 to the door 16, the door may be electro-coated. The coating prevents rust and also promotes adhesion of the foam. A space is created between the slot 20 and the gasket 40. The foam 46 is allowed to freely move along the surface of the substrate 12 and the door 16. The foam 46 contacts the layer 42 and is prevented from impregnating the gasket 40 or seeping behind the door 16. In the absence of the layer 42, the foam 46 may pass through the slot 20 and impregnate the foam gasket 40. This may cause the foam 46 to adhere to the flap 22 and impede its ability to remove the cutout section of substrate.

After the foam is allowed to cure, an intense light beam scores the instrument panel 10. A laser 48 images a focused beam of light 50 onto the back surface substrate 12. The beam 50 cuts an aperture 52 through the substrate 12, gasket 40, layers 42, 44 and foam 46. The beam 50 is aligned to pass through the slot 20. The beam 50 partially penetrates the covering 14. As the beam 50 begins to penetrate the covering 14, it is detected by a light detector 52 positioned opposite to the laser 48. A controller (not shown) receives a signal from the detector 52 and signals the laser 48 to move along the opening path 54 or to reduce power to the laser 48.

Laser scoring ratio is dependent on cover, foam and substrate materials, and airbag deployment performance. Cutting path 54 can be tailored in depth and length (either continues or interrupted) to provide the best system performance. Minimum radii of the laser cutting path 54 are at the corners opposite the folding axis is 25 mm when measured in a plane perpendicular to the airbag deployment direction.

Figure 5:
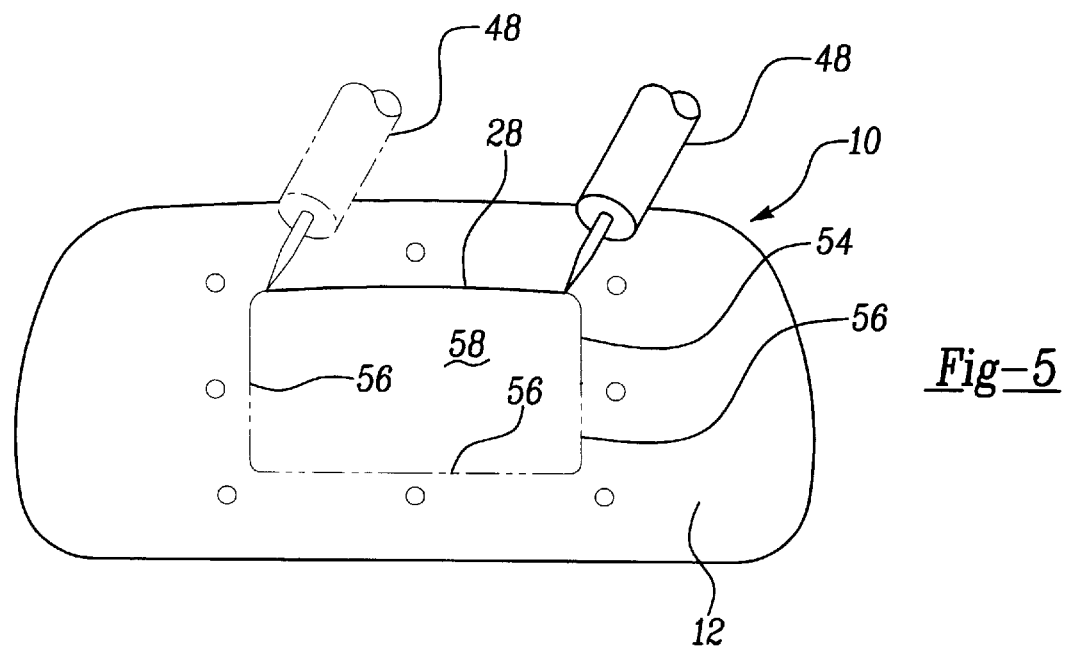
FIG. 5 is a plan view of the under surface of the instrument panel illustrated in FIG. 3.

The beam 50 completely penetrates the substrate 12, gasket 40 and layers 42, 44 but only partially penetrates the covering 14. The covering is scored to form an easily fracturable opening path 54, but the outer surface of the covering 14 displayed to the passengers is not visibly marred. The laser 48 is moved along the substrate 12 as shown in FIGS. 4 and 5. In the areas 56 that overlies the tabs 30, 32, 34, the beam 50 does not penetrate through the foam 46 or covering 14. The substrate 12 is however completely severed. The areas 56 are relatively small and the airbag has sufficient force to tear through these areas of covering 14 and foam 46. Similarly, the beam 50 does not penetrate through the door 16 along the folding axis 28. The system controller moves the beam along the areas backed by steel without the detector 52 sensing the beam 50.

Figure 6:
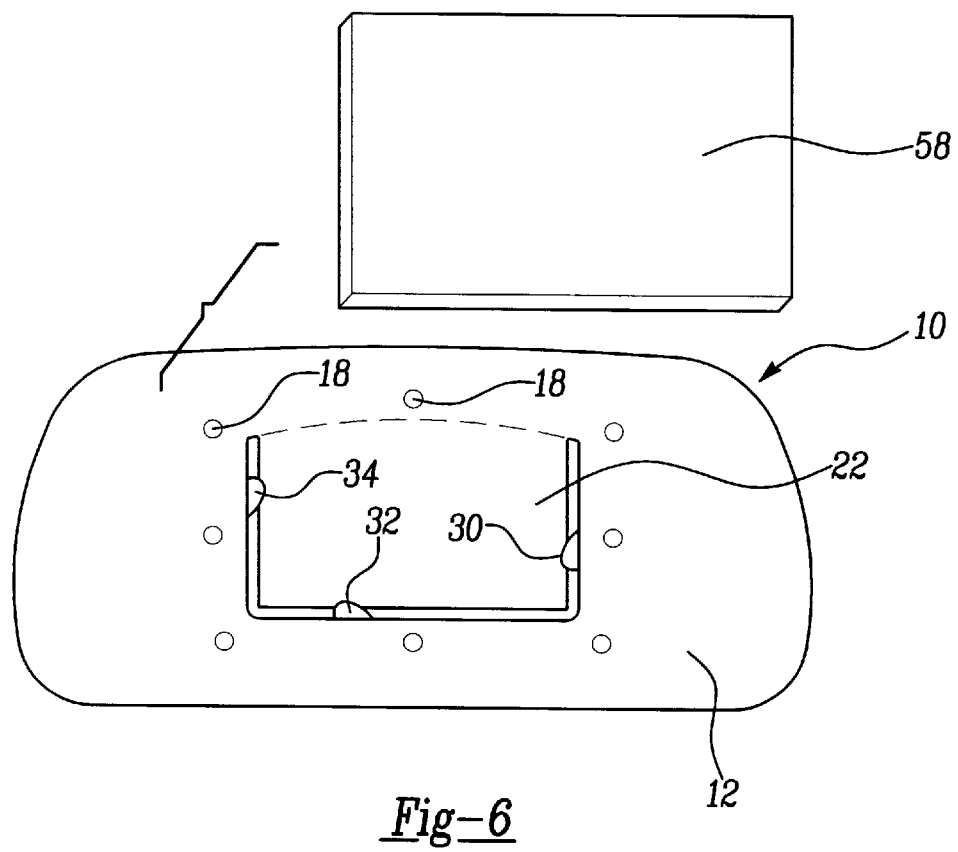
FIG. 6 is a plan view of the under surface of the instrument panel illustrated in FIG. 5, removing a cutout portion of substrate.

After the laser 48 has been moved along the opening path 54, a cutout section 58 of the substrate 12 is severed and removed as shown in FIGS. 5 and 6. The flap 22 and tabs 30, 32 and 34 are exposed through the under surface of the instrument panel 10 as shown in FIG. 6.

The detector 52 measures the light output of the laser as it forms the opening path 54 as shown in FIGS. 3 and 4. A series of measurements are reported to the controller. If any of the measurements are too large, this signifies that the light beam 50 has made too large an aperture in the covering 14. This may mar the appearance of the instrument panel 10 or weaken the covering and cause premature failure. Because these imperfections may not be easily visible, the controller may be programmed to direct the laser 48 to form a large and visible aperture through the covering 14, thus rendering the instrument panel 10 useless. This may be used as a control device to mark panels that were not produced in accordance with a predefined process. Instrument panels not produced in accordance with these process parameters may not operate correctly and are destroyed by the laser. This may also serve as a manufacturing record for each panel to track processing variables such and the number and dimension of the scoring apertures.

Figure 7:
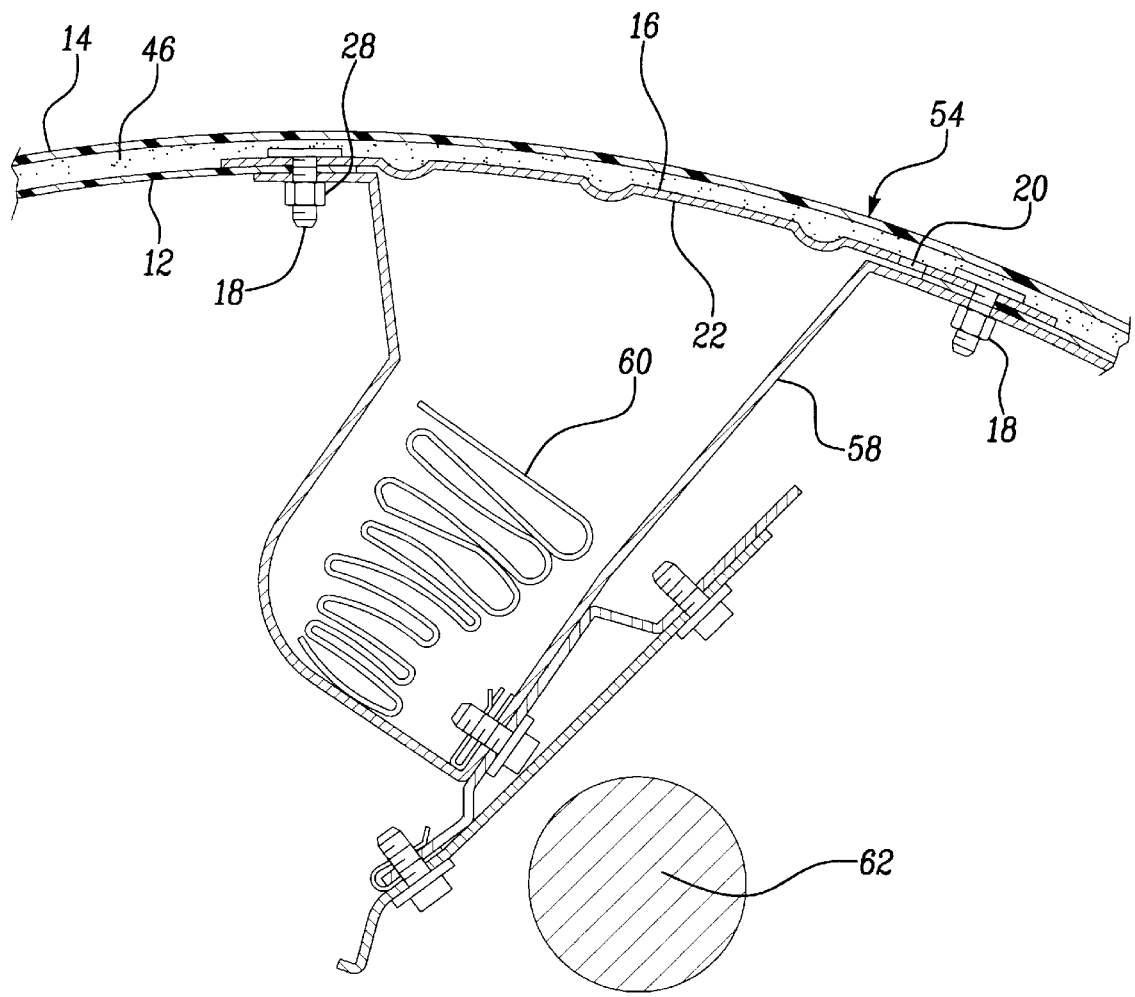
FIG. 7 is a cross-sectional view of instrument panel and airbag assembly in a vehicle.

An airbag chute 58 and airbag 60 are secured to the under surface of the substrate 12 by means of the attaching fasteners 18, as shown in FIG. 7. The instrument panel 10 is installed within a vehicle (not shown), usually adjacent a cross-car beam 62. In the event of a collision, the airbag 60 inflates and passes through the chute 58. The rapidly expanding airbag 60 pushes the flap 22 outwardly. The flap 22 causes the covering 14 to sever along the fracturable opening path 54 as the airbag door 16 opens.

The invention has been described as a method of manufacturing an automotive instrument panel using the drawings and description provided. While the best modes for carrying out the invention have been described in detail, those familiar with the art to which this invention relates will recognize various alternative designs and embodiments for practicing the invention as defined by the following claims.

What is claimed:

1. A method of manufacturing an automotive instrument panel having a concealed airbag comprising the steps of:

molding a substrate to having first and second surfaces;

providing a metal door having a peripheral portion and a slot that defines a door, this door being one of U-shaped, H-shaped, or oval shaped, a generally U-shaped slot with first and second ends defining a foldable flap, the line between said first and second ends defining a folding axis for said flap;

securing said door to said first substrate surface;

positioning a covering over said door and said substrate;

injecting a foam between said substrate and said covering to secure said covering to said substrate and said door;

imaging said substrate second surface in the area overlying said slot with a high intensity light beam and causing said light beam to completely penetrate said substrate and foam and to partially penetrate said covering, said light beam passing through said slot in said metal door and causing said substrate, foam and covering to form a fracturable opening path;

imaging said substrate second surface in the area overlying said folding axis with a high intensity light beam and causing said light beam to completely penetrate said substrate and contact said door, said light beam severing a section of said substrate;

removing said severed section of substrate to form an aperture through said substrate for an airbag; and securing an airbag behind said aperture, said airbag having sufficient force to fracture said opening path and fold said door when activated.

2. The method of claim 2, further comprising placing a light measuring device opposite said light beam and measuring light energy that passes through said substrate, foam and covering.

3. The method of claim 2, further comprising controlling the output of said light beam based on said measured energy.

4. The method of claim 3, wherein the energy of said light beam is reduced when said measuring device senses light passing through said covering.

5. The method of claim 3, wherein said light beam is moved when said measuring device senses light passing through said covering.

6. The method of claim 3, further causing said light beam to form a large, visible aperture through said covering if said measuring devices detects that the light beam has caused too large a penetration in said covering.

7. A method of manufacturing an automotive instrument panel having a concealed airbag comprising the steps of:

molding a substrate to having first and second surfaces;

providing a metal door having a peripheral portion and a generally U-shaped slot with first and second ends defining a foldable flap, the line between said first and second ends defining a folding axis for said flap;

securing said door to said first substrate surface;

positioning a covering over said door and said substrate;

injecting a foam between said substrate and said covering to secure said covering to said substrate and said door;

imaging said substrate second surface in the area overlying said slot with a high intensity light beam and causing said light beam to completely penetrate said substrate and foam and to partially penetrate said covering, said light beam passing through said slot in said metal door and causing said substrate, foam and covering to form a fracturable opening path;

positioning a light measuring device opposite said light beam and measuring light energy that passes through said substrate, foam and covering;

controlling the output of said light beam based on said measured energy;

imaging said substrate second surface in the area overlying said folding axis with a high intensity light beam and causing said light beam to completely penetrate said substrate and contact said door, said light beam severing a section of said substrate;

removing said severed section of substrate to form an aperture through said substrate for an airbag; and securing an airbag behind said aperture, said airbag having sufficient force to fracture said opening path and fold said door when activated.

8. An automotive instrument panel having a concealed airbag comprising:

a molded substrate having first and second surfaces and an aperture receiving an airbag therethrough;

a metal door secured to said first substrate surface and having a peripheral portion and a generally U-shaped slot with first and second ends, said U-shaped slot overlying three perimeter sides of said aperture and defining a foldable flap;

a covering overlying said door and said substrate;

a foam between said door and covering securing said covering to said substrate and said door;

imaging said substrate second surface in the area overlying said slot with a high intensity light beam and causing said light beam to completely penetrate said substrate and foam and to partially penetrate said covering, said light beam passing through said slot in said metal door and causing said substrate, foam and covering to form a fracturable opening path;

an airbag secured to said substrate second surface behind said aperture, said airbag having sufficient force to fracture said opening path and fold said door when activated.

* * * * *